US006419967B1

United States Patent
Creed et al.

(12)

(10) Patent No.: US 6,419,967 B1
(45) Date of Patent: *Jul. 16, 2002

(54) PEEL MATERIAL PH LEVEL ADJUSTMENT PROCESS AND APPARATUS

(75) Inventors: Sherman Howell Creed; Rey A. Elizondo; Robert Leland Frenkel, all of Fresno; Lloyd F. Hay, Oakdale; Westley W. Walter, Madera, all of CA (US)

(73) Assignee: FMC Technologies, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/703,173

(22) Filed: Oct. 30, 2000

Related U.S. Application Data

(60) Continuation-in-part of application No. 09/429,222, filed on Oct. 28, 1999, now Pat. No. 6,155,163, which is a division of application No. 09/143,599, filed on Aug. 31, 1998, now Pat. No. 6,007,855.

(51) Int. Cl.[7] .............................................. A01K 43/00
(52) U.S. Cl. ........................ 426/231; 426/615; 426/626; 426/478; 426/479; 426/482
(58) Field of Search ................................ 426/231, 615, 426/626, 478, 479, 482; 99/516

(56) References Cited

U.S. PATENT DOCUMENTS

| | | | |
|---|---|---|---|
| 3,873,753 A | 3/1975 | Nelson et al. .............. | 426/373 |
| 4,082,859 A | 4/1978 | Katzen ....................... | 426/636 |
| 4,437,934 A | 3/1984 | Nelson et al. ............. | 159/47.1 |
| 4,557,799 A | 12/1985 | Nelson et al. ................ | 159/44 |
| 5,361,683 A | 11/1994 | Silvestrini et al. ............ | 99/356 |
| 5,375,654 A | 12/1994 | Hougland et al. ........ | 165/109.1 |
| 5,436,022 A | 7/1995 | Chiang et al. .............. | 426/626 |
| 6,007,855 A | 12/1999 | Creed et al. ................. | 426/231 |
| 6,155,163 A | 12/2000 | Creed et al. ................... | 99/516 |

*Primary Examiner*—Nina Bhat
(74) *Attorney, Agent, or Firm*—Dorsey & Whitney LLP

(57) ABSTRACT

A tomato peel material pH level adjustment system (10) including a plurality of peel material receiving tanks (32, 33), pumps (36, 37), acid injection devices (71, 46, 48), mixing devices (34, 35) and mixing conduits (40, 41) extending to a system output such as storage holding tank or process equipment (42). A plurality of pH sensors (56, 58, 60) sense the pH level of the tomato peel material and acid mixture in the receiving tanks (32, 33) and in the mixing conduits (40, 41) and a controller (PC) responsive to pH level sensing signals causes acid injection into the peel material (22) while in the receiving tanks (32, 33) and/or while in the mixing conduits (40, 41). Base material optionally also can be added to the mixing conduits (40, 41) to correct pH level overshoots. Rather than adding acid or a base, the tomato peel material (22) can be diverted back from the mixing conduits (40, 41) to the receiving tanks (32, 33). The system (10) preferably includes a plurality of replicated batch processing units or modules, which are supplied continuously from a tomato peel material supply source (28) and drawn down to the holding tank (42).

14 Claims, 2 Drawing Sheets

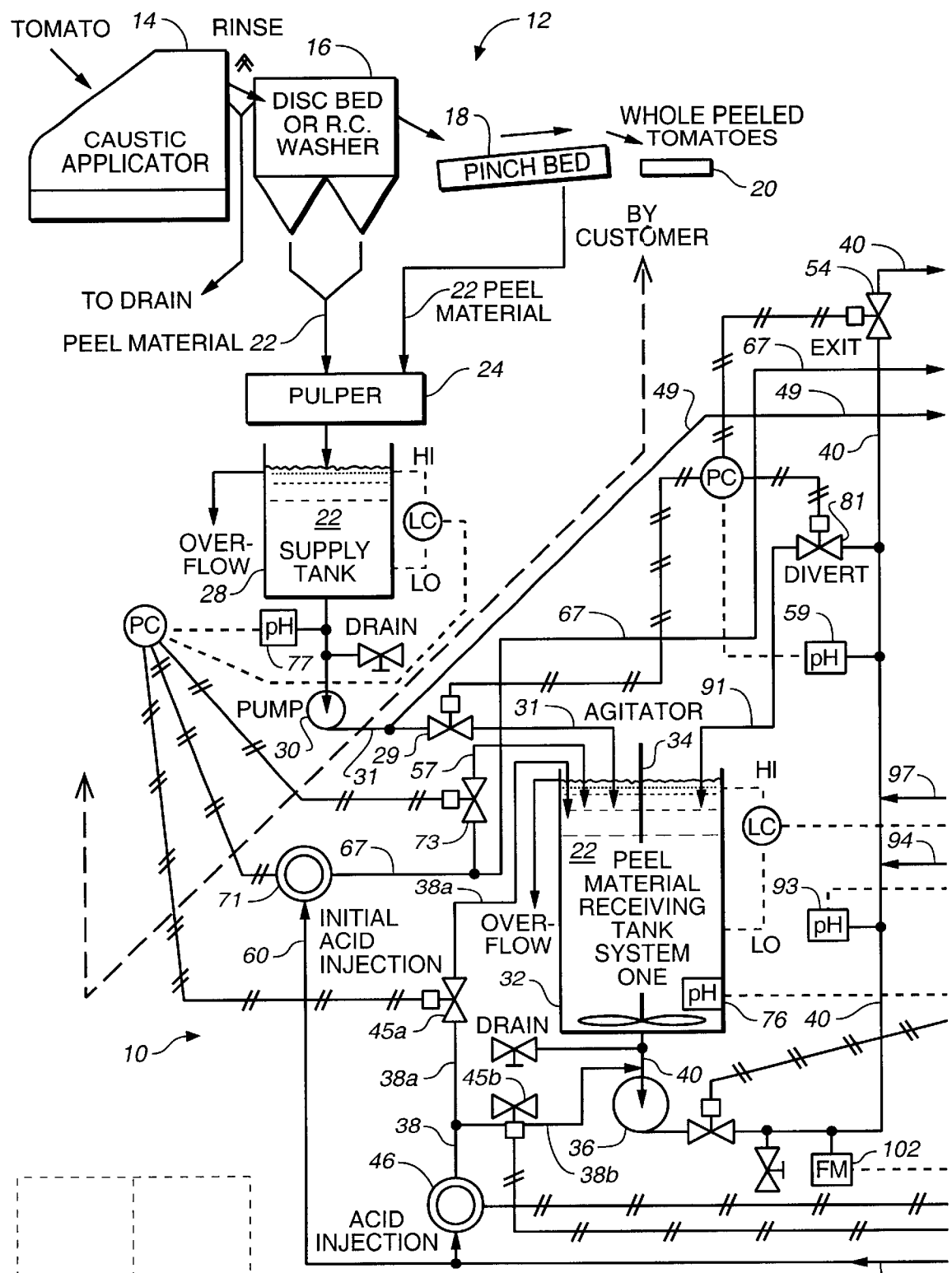
FIG._1A

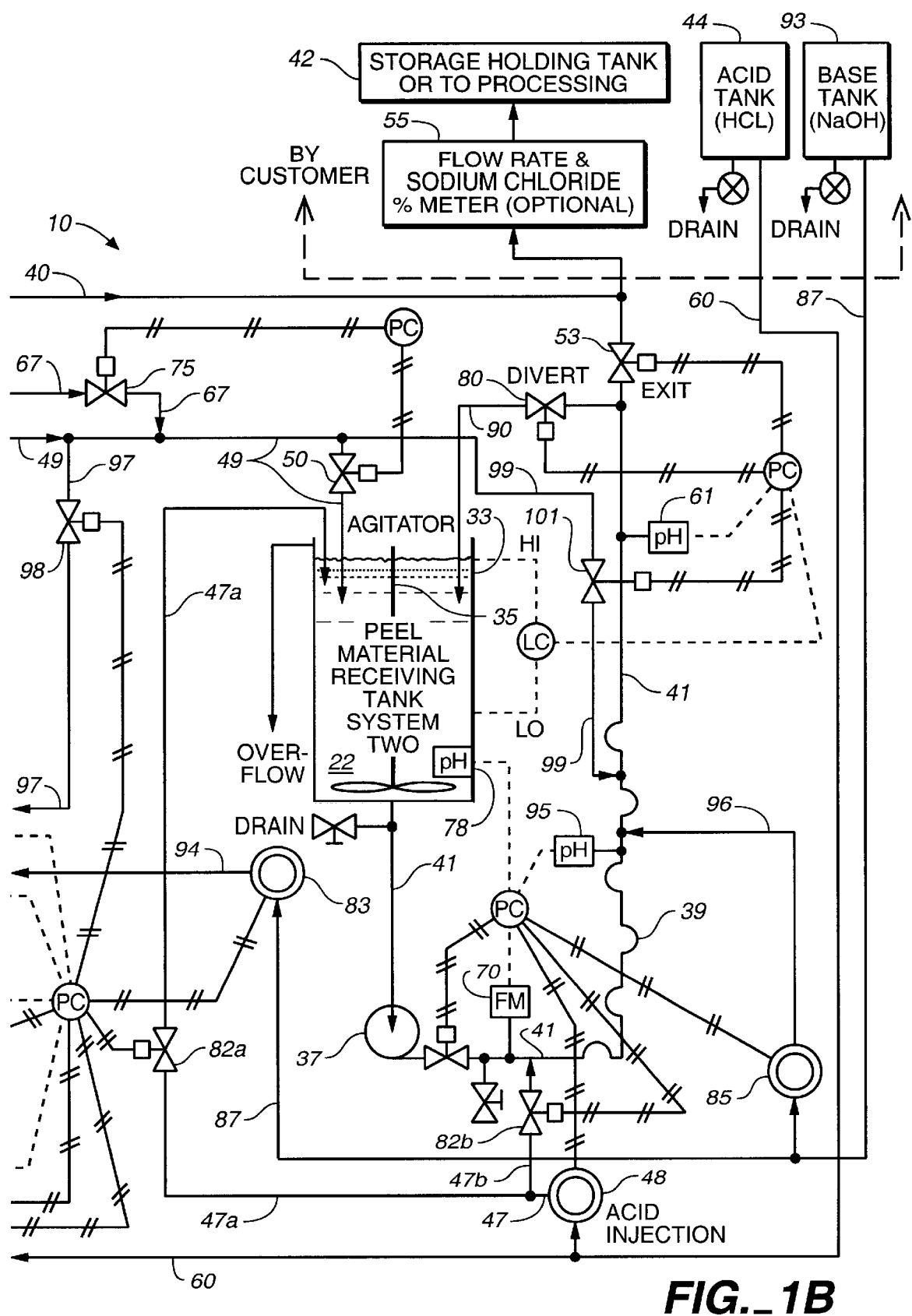
FIG._1B

PEEL MATERIAL PH LEVEL ADJUSTMENT PROCESS AND APPARATUS

RELATED APPLICATIONS

This application is a continuation-in-part application based upon application Ser. No. 09/429,222, filed Oct. 28, 1999 for PEEL MATERIAL ACIDIFICATION APPARATUS now U.S. Pat. No. 6,155,163, which application was a divisional application based upon application Ser. No. 09/143,599, filed Aug. 31, 1998 for PEEL MATERIAL ACIDIFICATION APPARATUS AND METHOD, now U.S. Pat. No. 6,007,855.

TECHNICAL FIELD

The present invention relates to a process and apparatus for treating produce by-products, and particularly tomato peel material after removal of the peels from tomatoes, for the purpose of adjusting the pH level thereof to enable subsequent use of the tomato peel material in food products or to enable easier disposal of the tomato peel material.

BACKGROUND ART

In automated tomato processing facilities, it is common to process tomato peels after removal from tomatoes by adding acid, such as HCL acid, to the tomato peels and then adding the acidified tomato peel material to a product such as pizza sauce. Tomatoes typically have a pH level of about 4.0, but tomato peel material can have a pH level as high as 13.0 pH when the peels are removed using a caustic peeling process. It is desirable and necessary, therefore, to lower the pH level closer to approximately the 4.0 pH level of whole tomatoes, so that the peel material is suitable for use in pizza sauces and other commercial food products. Alternatively, if the tomato peel material is simply going to be disposed of, it is desirable to lower the pH level to between 8.0 and 9.0 prior to disposal.

One process for acidifying tomato peels is to introduce batches of tomato peels into an acidification tank, add acid to the peel material, circulate the tomato peels and acid in the acidification tank in order to mix the two, and then test the pH of the peel material. If the pH needs adjusting, the appropriate acid level adjustment is made and the material is mixed until the pH level is correct. When the pH level is within an acceptable range, the material is pumped out of the tank and a new batch of tomato peel material is then introduced into the tank to be acidified.

Such prior art batch systems have several drawbacks, one of which is inconsistent mixing of the pureed tomato peel material and the acid, and another of which is a slower than desired processing rate. Full, uniform mixing of the peel material and the acid is not always achieved due to the limited extent to which the acidification tank mixing system can fully mix pureed material and acid. In addition, the batch system is inherently slow because the next batch of tomato peel material cannot be acidified until acid level of the current batch is raised to the desired level. Moreover, in some instances, or as a part of the pH adjustment process, it may be necessary to raise the pH level of the tomato peel material by adding a base-containing material to achieve the desired pH level. The apparatus and process of the present invention seek to address these problems and to provide a continuous system that achieves a quick, uniform pH level adjustment of the treated tomato peel material.

DISCLOSURE OF INVENTION

The process of adjusting or controlling the pH level of tomato peel material of the present invention is comprised, briefly, of the steps of mixing tomato peel material in a receiving tank; pumping the tomato peel material from the receiving tank to a storage holding tank or to processing equipment through a mixing conduit; sensing the pH level before pumping and after pumping in the mixing conduit, and adding acid before pumping and/or in the mixing conduit, if the pH level is above predetermined levels at either pH sensing location. The mixing of added acid with tomato peel material occurs in both the receiving tank and the mixing conduit to the storage holding tank or processing equipment. The process can further include the steps of diverting tomato peel material back to the receiving tank, or to drain, from the mixing conduit, and/or adding base material to the tomato peel material if the pH level is too low.

In another aspect of the process of the present invention, a plurality of batch receiving and mixing tanks are provided and are coupled by pumps and mixing conduits to a holding tank for the processed tomato peel material. The additional receiving tanks and mixing conduits are each provided with pH sensors, and acid and/or base can be added to the tomato peel material in the receiving tanks and the mixing conduits. The input of tomato peel material from a supply source to the plurality of receiving tanks may be continuous as one tank is filled after the other, while the output pumps from the tanks are controlled to pump mixed acid and peel material from one tank while the others are being filled.

The apparatus of the present invention comprises, briefly, at least one receiving tank, a mixing device in the receiving tank, a holding tank or tomato peel material processing system, a mixing conduit between the receiving and holding tank or processing system, a pump coupled to pump tomato peel material from the receiving tank to the holding tank or processing system, pH sensors positioned to sense the pH level in the receiving tank and in the mixing conduit, an acid adding assembly coupled to add acid to the receiving tank and to the mixing conduit, and a controller responsive to pH level and level control signals to control pumping and the addition of acid to the peel material in the receiving tank, or in the transfer conduit, if the pH level sensed is above a predetermined level at one of the sensor locations. A plurality of receiving tanks enabling continuous input from a supply source or tank. A system for adding a base-containing material in response to pH level sensing signals also is optionally provided for further control capability.

These and other features, objects and advantages of the present invention will become apparent from the following description of the Best Mode for Carrying Out the Invention, when read in conjunction with the accompanying drawings, and the claims, which are incorporated herein as part of the disclosure of the invention.

BRIEF DESCRIPTION OF THE DRAWINGS

FIG. 1 is a diagram of the relationship of FIGS. 1A and 1B.

FIG. 1A is a schematic diagram of a portion of tomato peel material pH control system constructed in accordance with the present invention.

FIG. 1B is a schematic diagram of a remainder of the tomato peel material pH control system shown in FIG. 1A.

BEST MODE OF CARRYING OUT THE INVENTION

Reference will now be made in detail to the preferred embodiments of the invention, examples of which are illustrated in the accompanying drawings. While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit and scope of the invention as defined by the appended claims.

FIGS. 1A and 1B show an embodiment for a tomato peel material pH adjustment system 10 that is designed for use in modifying the pH of tomato peel material that is received from a caustic tomato peeler system, designated generally at 12. Tomato peeler system 12 is shown for exemplary purposes and the particular type of caustic peeler equipment used to remove tomato skins from whole tomatoes is not critical to the present invention. As designed, the peel material pH adjustment system of the present invention processes tomato peel material regardless of the process used to remove the skins.

Tomato Peel Material Supply System

Briefly, tomato peeler system 12 includes a caustic or lye applicator 14 in which a base, such as a sodium hydroxide (NaOH) solution, is applied to the tomatoes to loosen the skins from the bodies of the tomatoes. The tomatoes are then moved through a scrubber 16 and a pinch roller bed 18 in which the skins are scrubbed or pulled from the tomato bodies. The peeled tomatoes 20 are then transferred to processing lines for canning, typically either as whole, diced, crushed or pureed tomatoes.

As further background, canned tomato processing has become highly automated in recent years to the point where manual handling of tomatoes is limited primarily to sorting operations. In general, tomatoes are brought in from harvested fields in multi-ton gondolas, after having been cut and/or shaken from their vines. From the gondola, tomatoes for canning are generally dumped into a water tank and are conveyed by a water flume to one of two types of peel remover processing lines, a lye (caustic) peeler line or a steam peeler line.

Over the years, tomatoes for commercial processing have been cultivated and horticulturally bred to produce generally uniform shapes and sizes and, perhaps most importantly, to ripen at the same time so that the entire tomato laden stalk can be cut and processed at one time. Canning tomatoes come primarily in two shapes, pear-shaped and round, and they are generally about 1½ to 2½ inches in diameter, which uniform size allows for more efficient automated processing. Also, canning tomatoes have been bred to produce tough skins that can withstand the handling associated with mechanized operations. Larger beefsteak tomatoes and similar varieties are reserved for consumer produce markets.

Prior to the lye peeler line, color sorting removes from the harvested tomatoes any light and white tomatoes, and personnel remove some broken, overly ripe or otherwise soft tomatoes. Then, in a lye peeler line, tomatoes are placed in buckets and dunked for about 30 seconds in a 12–14% solution of sodium hydroxide (NaOH) at about 215° F., just below the boiling point of the solution. After being dunked in the lye solution, the tomatoes are raised out of the lye solution and held for about 15 seconds prior to proceeding to a rotary scrubber. Dunking the tomatoes in NaOH solution has the effect of loosening the skins from the bodies of the tomatoes, but does not actually separate the skins or remove them from the tomatoes.

In rotary scrubber 16, rubber band-like members scrub the skins off of the tomatoes as they are conveyed by a helical screw. Peeled skins are discarded from the scrubber and are often thrown away. The tomatoes then move through pinch roller bed 18 to remove any remaining peels and tags, after which the tomatoes are approximately 95% peeled and have about 75% of their solids left. Manual sorting personnel then sort through the tomatoes again, as they continue to move on a conveyor, to remove any residual skins or blemishes.

After the peeling process is complete, peeled tomatoes are either canned whole or are cut and canned as tomato chunks. Soft and broken tomatoes that are sorted out by the manual sorters are used for puree or are evaporated into tomato paste.

Referring back to FIG. 1A, from scrubber 16 and pinch roller bed 18, tomato peel material 22 is transferred to a pulper or other comminuting equipment 24 where the peel material is pureed. From pulper 24, tomato peel material 22 is transferred to a supply tank 28, which may not be necessary, depending on the processing facility. It would be possible, for example, to transfer pureed tomato peel material directly from pulper 24 to pH level control apparatus 10 of the present invention.

Since peeler 12 is a caustic peeler system, the tomato peel material coming from pulper 24 to supply tank 28 will normally have a pH level which is undesirably high for most food uses or even peel disposal as a result of the residual caustic material carried forward on the peels. Accordingly, the pH control system of the present invention is primarily concerned with lowering the pH level of the tomato peel material by adding acid to the peel material and uniformly mixing the added acid to produce tomato peel material with a pH level approximating the level of ripe tomatoes, namely, a pH level of about 4.0 for subsequent food uses and 8.0 to 9.0 for disposal. In order to adjust the pH level, the system of the present invention advantageously also has the capability of adding a basic material to the tomato peel material.

Tomato Peel Material pH Adjustment-Basic System

The tomato peel material pH level adjustment or control apparatus and method of the present invention features numerous improvements as compared to our invention set forth in our U.S. Pat. No. 6,007,855. One area of improvement is the provision for continuous processing of tomato peel material supplied from peeler system 12 through the use of a plurality of batch-type tomato peel material receiving tanks. Another area is the use of acid injection in the receiving tanks as well as in the mixing conduits, which mixing conduits need not include dimple tubing or special mixing structures in the tubing. Still another area is the capability to adjust pH level using a base solution, or optionally untreated, high pH, tomato peel material.

FIGS. 1A and 1B together show a plurality of optional features of the system of the present invention, while FIG. 1A alone shows the basic system with a first receiving tank and related processing assembly having a configuration believed to be applicable to most processing applications. For continuous processing applications, the receiving tank, pumps, sensors, injectors of FIG. 1A would simply be replicated to produce a multi-tank system suitable for continuous processing of supply peel material. For special situations, and for continuous processing with additional features, FIG. 1B illustrates how the optional features can be added to the first receiving tank of FIG. 1A. FIG. 1B also shows still further optional features in connection with the second receiving tank, which further features could be imported back into the basic batch receiving tank assembly of FIG. 1A.

Referring now to FIG. 1A and the basic pH adjustment unit or module, peel material pH adjustment system 10 can be seen to receive tomato peel material 22 from supply source such as tank 28 via a supply pump 30. Pump 30 pumps the peel material into at least one, and preferably a plurality of receiving tanks, via a supply conduit assembly including conduit 31 and inlet valve 29, to a first receiving tank 32. A transfer system pump 36 pumps the tomato peel material from first receiving tank 32 through a flow path generally defined by a mixing conduit 40 to the output of the pH level adjustment system, such as a storage holding tank or peel material processing equipment 42 (FIG. 1B).

Receiving tank 32 has associated with it an acid injection conduit 57 fed by an initial acid injection pump 71, and controlled by solenoid valve 73. The flow rate of acid into line 57 and into receiving tank 32 is ultimately controlled by a controller PC electrically coupled to pump 71 and valve 73 in response to sensed pH measurements, as set forth below. An acid supply conduit 60 extends from acid source or tank 44 (FIG. 1B) to injection pump 71, and, as described below, to secondary acid injection pumps 46 and 48.

To enable control of the pH level of tomato peel material 22, pH sensors 76 is provided in tank 32 preferably near the bottom of the tank, for measuring the pH level prior to pumping tomato peel material from the tank. Optionally, a pH sensor 77 can be provided in supply conduit 31 or supply tank 28 so that the pH from caustic peeler assembly 12 also is known. This information can be stored in controller PC and used in adjusting the pH level by controlling the acid injection into the tomato peel material. Within receiving tank 32, an agitator 34 is provided to effect mixing of injected acid and tomato peel material, and pH sensor 76 tests for the pH level of the mixture in tank 32.

Generally, initial acid injection pump 71 runs at the same time as supply pump 30 so that acid is being injected into tank 32 and into tank 33 at the same time as tomato peel material is being pumped to the receiving tanks 32, 33. Valves 73 and 75 essentially switch the initial acid injection as between tanks 32 and 33 at the same time as valves 29 and 50 control the flow of supply tomato peel material into tanks 32, 33.

System 10 also preferably includes a secondary acid injection pump 46 which functions to enable the addition or injection of still additional acid into the tomato peel material during mixing in tank 32. Secondary acid injection pump also can be used to inject acid into tomato peel material in mixing conduit 40. Thus, conduit 38 from secondary acid injection pump 46 is bifurcated into line 38a having a valve 45a therein and a line or conduit 38b with valve 45b therein. Conduit 38a injects additional acid into mixing tank 32, while conduit 38b injects acid into conduit 40 in advance of pump 36. Switching between the two or stopping acid injection is controlled by operation of valves 45a and 45b. While acid pump 46 could inject acid to mixing conduit 40 downstream of transfer pump 36, it is highly desirable to add acid to mixing conduit 40 prior to pump 36 so that the pump itself will effect mixing due to turbulence generated in the transfer pump.

A suitable pH sensor 59 is provided for monitoring the tomato peel acid concentration after a substantial length of mixing conduit 40. Should the acidity not be correct return conduit 91 can be provided for redirecting the peel material back into receiving tank 32 using diverter valve 81, or the diverter valve 81 can be employed to dump the peel material to drain or other destination (not shown) until the acidity is corrected. A computer controller (PC) is electrically connected to the various valves, pumps, level controls (LC) and/or optionally, flow meters, and pH sensors and is responsive to sensed pH levels and sensed fluid levels to control pump operation in order to achieve balanced system flow and a properly adjusted pH level in the tomato peel material. As shown in the drawing, a double slash across a line indicates control signal sent from controller PC to the pumps and valves, while a broken line indicates sensor and level control sensor signals (or flow meter sensor signals) sent to controller PC. As will be appreciated, signals can be sent in both directions, for example, if the controller polls a level control or flow meter (FM) for the current level or flow rate.

Mixing conduit 40 may include a structure which enhances mixing of the tomato peel material and added acid, such as a length of dimple tubing. While dimple tubing can be provided in the mixing conduit, and is shown in FIG. 1B, such devices also increase the resistance to flow of the somewhat viscous tomato peel material.

The transfer pump 36 produces substantial turbulence and mixing, and when conduit 40 is of a substantial length, for example, in excess of 10 feet to system output, namely to a storage holding tank or processing system 42, the length of the mixing conduit, and the bends which will typically be required, will produce substantial additional mixing so that the use of dimple tubing is optional. Conduit 40, therefore, is shown as extending from receiving tank 32 to pH adjustment output or holding tank/processing 42 without having a length of dimple tubing therein.

Accordingly, the basic unit or module of pH level adjustment apparatus 10, as shown in FIG. 1A, includes receiving tank 32 which receives peel material from a supply source, such as tank 28. The receiving tank includes an agitator or mixer 34 which mixes the incoming and resident peel material 22 with incoming acid added through acid injection line 57 and initial acid pump 71. Acid is added in an amount determined by the volume of peel material in tank 32 and the pH level, as sensed by one of sensors 76 or 77. If the pH level in tank 32 is above a certain predetermined value, for example, 6.0, further or additional acid can be injected into tank 32 through secondary pump 46 and acid injection conduit 38b. The amount of initial acid injected and the secondary acid injected can be calculated using an algorithm or stored look-up tables in controller PC, as is well known in the art.

As sensor 76 senses a lowering of the pH in tank 32, the acid injection or addition can be slowed by the controller and then stopped when the desired level is reached, for example 5.0. Transfer pump 36 is then operated to pump acidified peel material from tank 32 to tank 42 through mixing conduit 40. The controller PC can then make a secondary acid injection into mixing conduit 40 through conduit 38b at or in advance of pump 36. This secondary injection usually will be a lower amount than the initial acid injection and will again be calculated by the controller to drive the pH level to the eventual predetermined pH level for the peel material reaching storage tank/processing system 42, for example, 4.0.

Downstream of pump 36 and after a substantial length of mixing conduit 40, pH sensor 59 will again sense the pH level of the thoroughly mixed acid and peel material. If the pH level is at the target level, or target range, for example, 4.0±0.5, the peel material will be passed by exit valve 54 to storage holding tank or to processing system 42. If the pH level is still above the target level (range), exit valve 54 is closed and diverter valve 81 can be opened so that the peel material is passed back to tank 32 through conduit 91, or is passed to drain or other destination.

If pH sensor 59 is still sensing a pH level which is too high, the controller also can inject further acid into mixing conduit 40 by secondary acid pump 46 and conduit 38b so as to reduce the pH to the desired level (range) at pH sensor 59. Once the predetermined level (range) is reached, diverter valve 81 is closed and exit valve 54 opened to pass treated tomato peel material to tank/processor 42.

Obviously, other control techniques can be employed. For example, the target pH level (range) for tank 32 could be the eventual target, and pH sensor 59 used only to check or verify that, after mixing by pump 36 and further mixing by circulation down conduit 40 for a substantial length, the pH reading in the tank was really representative of the correct average pH level.

If the pH level in tank 32 is reasonably close to the target the pH level adjustment could be made by injecting only through conduit 38b into conduit 40 in advance of transfer pump 36, rather than into receiving tank 32 through conduit 38a.

Continuous Processing of Supply Peel Material

In another aspect of the present invention, the basic batch processing system of FIG. 1A is replicated and operated to allow continuous processing of the supply produced by peeling apparatus 12. Thus, a plurality of receiving tanks 32 and 33 are supplied by a supply conduit assembly which also includes a branch conduit 49 from supply conduit 31 in advance of valve 29 that extends to second receiving tank 33 and is controlled by inlet valve 50. By closing valve 29 and opening valve 50, tomato peel material can be directed to second receiving tank 33. At the same time, acid control valve 73 is closed and valve 75 opened so that the incoming peel material receives an initial acid injection.

Mounted in tank 33 are an agitator 34 and a pH meter 78 which operates as described in connection with first receiving tank 32. transfer pump 37 is mounted in a mixing conduit 41 that is fluid coupled to allow pumping of tomato peel material from the second receiving tank to holding tank 42.

As described in connection with the basic unit of FIG. 1A, a secondary acid injection pump 48 is provided to add acid to second receiving tank 33 and/or to mixing conduit 41. This secondary addition of acid is accomplished through conduit 47 which has branches 47a and 47b that are controlled by valves 82a and 82b. One modification illustrated in FIG. 1B is that the initial acid injection is accomplished by coupling injection conduit to supply conduit 49 in advance of tank 33. This causes the acid to begin mixing with peel material in conduit 49 and then to continue mixing in tank 33, rather than being introduced into the receiving tank through a separate acid injection conduit 57, as shown for tank 32.

Secondary acid injection pump 48 is coupled through conduit 82b in a manner which varies from the FIG. 1A batch tank assembly. Thus, conduit 82b introduces acid into mixing conduit 41 downstream of transfer pump 37, rather than in advance of pump 36, as shown in the FIG. 1A module.

Again, tank 33 is provided with a level control LC coupled to the controller PC, and mixing conduit 41 is provided with a flow meter 102 and pH sensor 61. The pH sensor is positioned downstream of pump 37 by a substantial length of conduit 41. A diversion valve 80 and return conduit 90 are coupled to mixing conduit 41, as described for the basic unit or module. Mixing conduit 41 of FIG. 1B also includes an exit valve 53.

Thus, the FIG. 1B unit or module can be batch operated in the same manner as described for the unit of FIG. 1A, and when operated together by controller PC they can be used to continuously process the output of the tomato peel material supply.

For either batch or continuous operation, the flow of tomato peel material through the modules, and particularly the supply and receiving tanks, can be controlled using level controls, designated in the drawing as LC, or by timed pumping at known or sensed flow rates. The level control approach is believed to be easier to implement and therefore is preferred.

For receiving tanks 32 and 33, therefore, sensing peel material 22 at high (HI) level control will shut down the flow from the peel supply or switch it to the other receiving tank. Pumping down the receiving tank until a low (LO) level is sensed will shut down the transfer pumps 36 and 37. Similar level control (LC) can be provided at supply tank 28 and used to shut off input to the tank or stop pump 30. It should be noted that supply pump 30 optionally can be allowed to run even to the point of emptying tank 28 with shut down occurring only if neither of the receiving tanks can accept peel material.

In a typical example, receiving tanks 32 and 33 might be 200 gallon tanks which are pumped down to a low level (LO) leaving 100 gallons in the tank so as to cover the agitators and pH meters and help ensure a more uniform mixed output to conduits 40, 41. Thus, about a 100 gallon working volume in tanks 32 and 33 would be a representative batch.

For timed operation, the system pumps would operate at a known or sensed rate for controlled time periods. Thus, system transfer pumps 36 and 37 each may have a pumping rate of, for example, 120 gallons per minute (GPM), although specific flow rates can vary depending on the application. Supply pump 30 also can be operated to pump tomato peel material into the receiving tanks at 120 GPM. In this manner, each receiving tank 32 and 33 can be sequentially filled with a batch of tomato peel material and acid and mixed, while the other tank is mixing and transferring peel material to output 42. For example, receiving tank 32 can be filled with peel material and initial acid injection for 50 seconds, after which 100 gallons of peel material will be pumped into tank 32 at the exemplary flow rate. While tank 32 fills and mixes, tank 33 is being pumped down for 50 seconds while the agitator continues mixing to pump out 100 gallons of the acidpeel material mixture. The process is switched back and forth between the receiving tanks for as long as there is an ample supply of input tomato peel material.

Thus, tomato peel material can be continuously pumped from supply tank 28 at a rate essentially matched to the peeler output, and the flow of batches of peel material into tanks 32 and 33 controlled by valves 29, 50 and initial acid injection controlled by valves 73, 75. Controlling PC can control this pumping using level control (LC) sensors or timed pump operation.

Peel pH control system 10 has several advantages over the prior art batch processing systems. First, the present system is a continuous pump-through system where tomato peel material is continuously drawn from supply tank 28 and pumped into the receiving tanks 32, 33, and additional receiving tank modules if required. A continuous flow-through system greatly increases processing rates. Second, the mixing conduits and transfer pumps downstream of the receiving tanks provide a more thorough mixing of the tomato peel material and acid, which allows acid injection after the mixing tanks to refine and better control the pH level. These advantages, individually and collectively, provide a significantly improved system and process for pH control of tomato peel material.

Further Optional System Features

Further optional system features can be provided in one or both of the FIG. 1A and FIG. 1B modules. An important optional feature of the present acidification system is a supplementary base injection system. A base tank 93 is connected with base injection pumps 83, 85 via conduit 87, and in turn, conduits 94 and 96 connect pumps 83, 85 with mixing conduits 40, 41 proximate their midpoints. With the base injection feature, should the acidity be too high in the mixing conduits, as measured by pH sensors 59 and 61 downstream, or by earlier optional sensors 93, 95, a base-containing solution, such as NaOH, can be added to readjust the acidity prior to completion of the mixing during transfer of the peel material through mixing conduits 40, 41 to the system output 42. If, for example, either the initial or secondary acid injections overshoot the target pH level (range), tomato peel material can be returned to tanks 32 and 33, or base material can be added at 94 and 96 to drive the pH level up, thus avoiding the need to divert material back to the receiving tanks or drain. It should be noted that diverted peel material could be diverted to either of tanks 32 or 33 in a system having a plurality of receiving tanks.

Alternatively or additionally, rather than add a base solution from reservoir 93, the present system also can include an optional conduit 97, extending from supply conduit 49, and a control valve 98, which will enable the injection or addition of base-containing tomato peel material directly from supply tank 28, into the mixing conduit 40. Similarly, a conduit 99 and control valve 101 can be used to add high base, tomato peel material from supply tank 28 into mixing conduit 41. To inject tomato peel material into mixing conduit 40, valve 29 would normally be closed, as would be valve 50 and valve 101. Similarly, to inject peel material into conduit 41, valves 29, 98 and 50 would normally be closed. It would be obvious to one skilled in the art that a separate peel injection line could be provided or some flow into the receiving tanks could occur when injecting peel material into the mixing conduits.

The system storage tank or processing equipment 42 also can have a flow rate and/or sodium chloride meter 55 which would work in conjunction with subsequent peel material processing equipment.

A final option shown in the FIG. 1B module is the inclusion of a length of dimple tubing 39 in mixing conduit 41. Dimple tubing 39 provides additional turbulence in conduit 41 which further ensures mixing. Pumping viscous tomato peel material through dimple tubing requires some additional pump power but the dimple tubing does not seriously impede continuous flow because the smooth dimple contours do not accumulate peel material. Dimple tubing 39, if used, may include approximately 1-inch diameter dimples that protrude approximately ⅜ of an inch into 2 inch diameter tubing and which dimples are staggered along the length of the tubing. As the tomato peel and acid mixture passes through the tubing, the inwardly protruding dimples create sufficient turbulence to thoroughly mix the tomato peel material with the acid. Suitable dimple tubing is disclosed in U.S. Pat. No. 5,375,654, issued Dec. 27, 1994.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto when read and interpreted according to accepted legal principles such as the doctrine of equivalents and reversal of parts.

What is claimed is:

1. A process for adjusting the pH level of tomato peel material comprising the steps of:
    (a) mixing tomato peel material in a first receiving tank;
    (b) pumping the tomato peel material through a mixing conduit from the first receiving tank to a system output to further mix the tomato peel material before it is transferred to the system output;
    (c) sensing the pH level of the tomato peel material prior to said pumping step; and
    (d) if the pH level during sensing is above a predetermined level, performing at least one of the following steps:
        (i) adding acid to the tomato peel material while in the receiving tank,
        (ii) adding acid to the tomato peel material while in the mixing conduit for mixing in the mixing conduit, and
        (iii) diverting the tomato peel material from the mixing conduit.

2. The process as defined in claim 1, and the step of sensing the pH level of the tomato peel material while in the mixing conduit.

3. The process as defined in claim 1 wherein,
    the step of adding acid before the pumping step is accomplished by adding acid to the receiving tank.

4. The process as defined in claim 1 wherein,
    the step of adding acid before the pumping step is accomplished by adding acid between the receiving tank and a transfer pump used in the pumping step.

5. The process as defined in claim 1, and the step of:
    prior to the mixing step, inputting tomato peel material to the receiving tank through a supply conduit; and wherein,
    the step of adding acid before the pumping step is accomplished by adding acid to the supply conduit during the inputting of tomato peel material to the receiving tank.

6. The process as defined in claim 2, and the step of:
    if the pH level of the tomato peel material in the mixing conduit is sensed to be below a predetermined level, performing at least one of the following steps:
        (i) adding a base solution to the tomato peel material while in the mixing conduit for mixing in the mixing conduit prior to reaching the system output,
        (ii) adding tomato peel material having a pH above the sensed pH to the tomato peel material flowing in the mixing conduit for mixing in the mixing conduit prior to reaching the system output, and
        (iii) diverting the tomato peel material flowing in the mixing conduit to a receiving tank.

7. The process as defined in claim 1, and the steps of:
    prior to the mixing step, inputting the tomato peel material from a supply tank to the first receiving tank until the amount of tomato peel material in the first receiving tank reaches a predetermined volume;
    when the tomato peel material in the first receiving tank reaches the predetermined volume, redirecting inputting of tomato peel material to a second receiving tank; and
    performing steps (a)–(d) of claim 1 on the tomato peel material diverted to the second receiving tank.

8. The process as defined in claim 7 wherein, the inputting and redirecting steps are both accomplished at a supply flow rate, and when the tomato peel material volume in the second receiving tank reaches a predetermined volume, terminating the redirecting step and commencing an inputting step at the supply flow rate to the first receiving tank.

9. A process for controlling the pH level of tomato peel material comprising the steps of:

(a) transferring the tomato peel material from a supply tank to a first receiving tank;

(b) mixing said tomato peel material while in the first receiving tank;

(c) sensing the pH level of the tomato peel material in the first receiving tank during the mixing step;

(d) if the sensed pH level of the tomato peel material in the first receiving tank is above a predetermined level, performing at least one of the steps of:

(i) adding an acid to the peel material during mixing in the first receiving tank, and (ii) adding an acid to the peel material after it leaves the first receiving tank;

(e) pumping the tomato peel material from the first receiving tank to a system output through a mixing conduit for further mixing of the tomato peel material and any added acid;

(f) if the sensed pH level is above a predetermined level, performing one of the following steps:

(i) adding an acid to the peel material in the receiving tank, (ii) adding an acid to the peel material during flow in the mixing conduit, and (iii) diverting the tomato peel material back to the first receiving tank.

10. The process as defined in claim 9 and the steps of:

sensing the pH level of the tomato peel material flowing in the mixing conduit, and if the sensed pH level in the mixing conduit is below a predetermined level, performing one of the following steps:

(i) adding a base to the peel material during flow in the mixing conduit;

(ii) adding tomato peel material having a pH level higher than the pH level sensed in the mixing conduit to the mixing conduit; and (iii) diverting the tomato peel material from the mixing conduit back to the first receiving tank.

11. The process as defined in claim 9 wherein, the transferring step is continued until the tomato peel material in the first receiving tank reaches a predetermined volume;

thereafter, transferring tomato peel material from the supply tank to a second receiving tank;

thereafter performing steps (b) through (h) of claim 9 on the tomato peel material in the second receiving tank.

12. The process as defined in claim 11 wherein, during the step of transferring tomato peel material to the second receiving tank, performing the pumping step on the tomato peel material in the first receiving tank until the volume of the tomato peel material in the first tank is reduced to a predetermined volume.

13. The process as defined in claim 12, and after the tomato peel material in the second receiving tank reaches a predetermined known volume, repeating step (a) of claim 9 and while step (a) is being performed, employing the pumping step on the tomato peel material in the second receiving tank to reduce the volume of the tomato peel material in the second receiving tank to a predetermined volume.

14. A process for continuous processing of tomato peel material to control the pH level comprising the step of:

transferring tomato peel material from a supply tank to a plurality of receiving tanks by pumping the tomato peel material into the plurality receiving tanks sequentially until a known volume of tomato peel material is supplied to each receiving tank;

mixing the tomato peel material in each receiving tank;

sensing the pH level of the tomato peel material in each receiving tank;

adding acid to each receiving tank having tomato peel material therein at a sensed pH level above a predetermined level during mixing in each receiving tank;

pumping mixed tomato peel material and added acid from each receiving tank to a system output through a mixing conduit at a flow rate selected to reduce the volume of tomato peel material in each receiving tank to a predetermined volume; and sensing the pH level of the tomato material flowing in the mixing conduit and performing at least one of the following steps dependent on the sensed pH level:

(i) diverting tomato peel material from the mixing conduit to one of the receiving tanks, (ii) adding an acid to the peel material while flowing in the mixing conduit, (iii) adding untreated peel material to the peel material in the mixing conduit, and (iv) adding a base material to the peel material while flowing in the mixing conduit.

* * * * *

UNITED STATES PATENT AND TRADEMARK OFFICE
CERTIFICATE OF CORRECTION

PATENT NO.      : 6,419,967 B1
DATED           : July 16, 2002
INVENTOR(S)     : Sherman Howell Creed et al.

It is certified that error appears in the above-identified patent and that said Letters Patent is hereby corrected as shown below:

<u>Title page,</u>
Item [75], Inventors, change "Westley W. Walter" to -- Wesley W. Walter --.

Signed and Sealed this

Fourth Day of February, 2003

JAMES E. ROGAN
*Director of the United States Patent and Trademark Office*